(12) United States Patent
Rinearson

(10) Patent No.: US 8,170,979 B2
(45) Date of Patent: May 1, 2012

(54) SYSTEMS AND METHODS FOR CALIBRATING USER RATINGS

(75) Inventor: Peter Rinearson, Vashon, WA (US)

(73) Assignee: Intersect PTP, Inc., Seattle, WA (US)

( * ) Notice: Subject to any disclaimer, the term of this patent is extended or adjusted under 35 U.S.C. 154(b) by 434 days.

(21) Appl. No.: 12/540,163

(22) Filed: Aug. 12, 2009

(65) Prior Publication Data

US 2010/0042577 A1 Feb. 18, 2010

Related U.S. Application Data

(60) Provisional application No. 61/088,300, filed on Aug. 12, 2008.

(51) Int. Cl.
*G06F 17/00* (2006.01)
*G06N 5/04* (2006.01)
*G06N 7/00* (2006.01)
*G06N 7/08* (2006.01)

(52) U.S. Cl. .......................................... 706/60; 706/56

(58) Field of Classification Search ........................ None
See application file for complete search history.

(56) References Cited

U.S. PATENT DOCUMENTS

| | | | | |
|---|---|---|---|---|
| 6,795,793 | B2 * | 9/2004 | Shayegan et al. | 702/179 |
| 7,664,747 | B2 * | 2/2010 | Petras et al. | 707/805 |
| 7,822,631 | B1 * | 10/2010 | Mey et al. | 705/7.29 |
| 2007/0143128 | A1 * | 6/2007 | Tokarev et al. | 705/1 |
| 2009/0216608 | A1 * | 8/2009 | Bechtel | 705/10 |

* cited by examiner

*Primary Examiner* — Kakali Chaki
*Assistant Examiner* — Daniel Pellett
(74) *Attorney, Agent, or Firm* — Kory D. Christensen; Stoel Rives LLP

(57) ABSTRACT

A website may allow users to rate content items displayed thereon. The user ratings associated with the content items may be weighted according to user rating weight. The rating weight of a particular user may be based, in whole or part, upon whether the user consistently rates content items similarly to one or more "expert" raters. The experts may be selected based on various factors including: professional training, experience, reputation on the website, or the like. If a particular user consistently rates content items similarly to the experts, the user may be given a high rating weight. Users whose ratings consistently diverge from the ratings assigned by the experts may be given a lower rating weight. The weights may be displayed in connection with a user profile, or may be hidden from the user community. The rating weights may be used in calculating an overall rating of a particular content item.

22 Claims, 3 Drawing Sheets

SYSTEMS AND METHODS FOR CALIBRATING USER RATINGS

CROSS-REFERENCE TO RELATED APPLICATIONS

This application claims the benefit of U.S. Provisional Application No. 61/088,300 filed Aug. 12, 2008, which is fully incorporated herein by reference.

TECHNICAL FIELD

This disclosure relates generally to systems and methods for calibrating user ratings. In particular, this disclosure relates to systems and methods for calibrating user-ratings based on comparisons between ratings submitted by users, and ratings submitted by one or more experts.

SUMMARY OF THE INVENTION

A user may be assigned a rating weight, which may be used to weight ratings submitted by the user relative to other user-submitted ratings. The rating weight assigned to a user may be calibrated or adjusted by comparing a rating submitted by the user to an expert rating. If the user submitted rating corresponds to the expert rating (e.g., is within a threshold of the expert rating), the rating weight of the user may be incremented. If the user submitted rating differs from the expert rating (e.g., differs by more than a threshold from the expert rating), the rating weight of the user may be decreased. The calibration of the user rating may be proportional to the proximity of the user-submitted rating to the expert rating.

One or more users may be designated as expert raters. The expert rating of a content item may be determined by ratings submitted by one or more expert raters. Alternatively, an expert rating of a content item may be determined a priori. If two or more expert raters submit a rating of a particular content item, the ratings may be combined into a single expert rating. The combination may be an average of the ratings. Alternatively, the combination may be a weighted average based upon relative expert rating weights of the expert raters.

Content submitted to the website may be rated by website users. The ratings may be combined into an aggregate rating of the content item. The aggregate rating may be based on an average of the user-submitted ratings. The average may be weighted according to rating weights of the respective users. The weighting may be linear, exponential, logarithmic, or some other weighting method.

Content may be rated in a number of different rating categories and/or aspects. A user may have a different rating weight in each of the different rating categories or aspects. The rating weights may be individually compared to and/or adjusted based upon expert ratings in the various rating categories or aspects.

An interface may be provided to display content submitted to the website. A rating weight of a user may be displayed in connection with content submitted by the user. This may allow other users easy and pervasive access to the rating weight of the user. The rating weight may be displayed in a user profile, which may provide information about a user of the website.

The interface used to display content may include an input through which a rating of the content may be submitted. The interface may also include a rating display, configured to display an aggregate rating of the content item. The interface may hide and/or omit the aggregate rating display until a user has submitted a rating of the content item displayed in the interface.

DETAILED DESCRIPTION OF PREFERRED EMBODIMENTS

Figure 1:
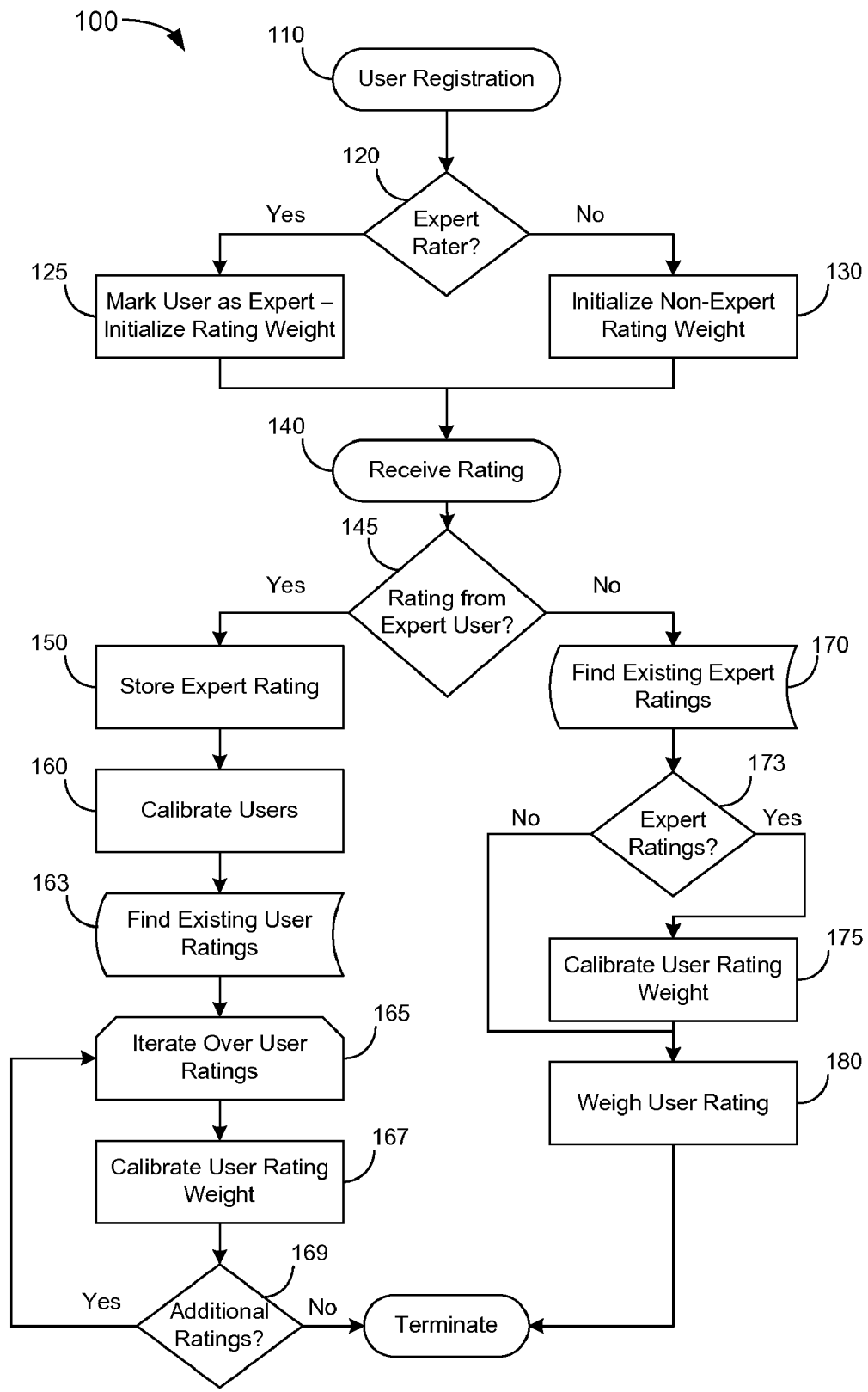
FIG. 1 is a flow diagram of one embodiment of a method for calibrating a user-rating weight.

Websites featuring user-contributed content have become very popular and are among the fastest growing websites on the Internet. Many of these websites rely on the quality of the content submitted by their respective user communities to attract and retain users. As such, these websites may wish to induce their users to submit high-quality content.

As used herein, submissions to a website by a user of the website may be referred to as "content" and/or a "content item." As used herein, content submitted to a website may include, but is not limited to: an image, an illustration, a drawing, pointer (e.g., a link, uniform resource indicator (URI), or the like), video content, Adobe Flash® content, audio content (e.g., a podcast, music, or the like), text content, a game, downloadable content, metadata content, a blog post or entry, a collection and/or arrangement of content items, or any other user-authored content. In addition, a content item may include, but is not limited to: a text posting in a threaded or unthreaded discussion or forum, a content item (as defined above) posting in a threaded or un-threaded discussion, a user-submitted message (e.g., forum mail, email, etc.), or the like.

As used herein, a website may refer to a collection of renderable content comprising images, videos, audio, and/or other digital assets that are accessible by a plurality of users over a network. A website may be published on the Internet, a local area network (LAN), a wide area network (WAN), or the like. As such, a website may comprise a collection of webpages conforming to a rendering standard, such as hypertext markup language (HTML), and may be renderable by a browser, such as Microsoft Internet Explorer®, Mozilla Firefox®, Opera®, or the like. However, other markup languages (e.g., Portable Document Format (PDF), extensible markup language (XML), or the like) and/or other display applications (e.g., a custom software application, a media player, etc.) may be used under the teachings of this disclosure. In addition, as used herein, a website may refer to a content provider service, such as a photo service (e.g., iStockphoto®, Getty Images®, etc.), a news service (e.g., Reuters, Associated Press, etc.), or the like.

Although the term "website" is used as a singular term herein for clarity, the disclosure is not limited in this regard. A website could refer to a collection of a plurality of websites. Moreover, as used herein a "user," may refer to a user identity on a particular website and/or a user identity that may span multiple websites. The "user," therefore, may refer to a "user account" on a particular website and/or a user identity that may be independent of any particular website, such as a Google® Account, a Microsoft Passport identity, a Windows Live ID, a Federated Identity, an OpenID® identity, or the like. Accordingly, a user and/or a "user community" as used herein, may refer to a collection of users within a single website and/or a collection of users that may span multiple websites or services.

In some embodiments, a website may encourage quality submissions by allowing other users to rate and/or critique user-contributed content. The ratings may be "overall" ratings of the content and/or may include ratings of particular aspects or categories of the content (e.g., "subject appeal," "technical merit," and so on). User-submitted ratings may be displayed in connection with the content. In some embodiments, the user-submitted ratings may be combined into one or more "aggregate" ratings of the content. The aggregate rating(s) may be displayed in connection with the content item. The submitter of the content may want to be sure that his or her content is highly rated and, as such, may be motivated to submit quality work to the website.

In some embodiments, highly-rated content may receive more attention on the website than lower-rated content. As such, the highly-rated content may "represent" the website in the sense that users may judge the quality of the content available through the website based on the highly-rated content featured thereon. The website may prominently feature highly-rated content on a "home" or "portal" page, on website advertising banners, or the like. New users accessing the website may be presented with the featured, highly-rated content and become interested in exploring the other content available on the site. Similarly, inbound links to the website may feature the highly-rated content, which in turn, may increase traffic to the site. As such, the highly-rated content may act as an effective form of advertisement for the website to grow the website's community user-base.

The website may be further configured to aggregate related content (e.g., into an "arena" comprising a collection of content items). Systems and methods for aggregating content items are provided in co-pending application Ser. No. 12/539,789, filed on Aug. 12, 2009, and entitled "Systems and Methods for Aggregating Content on a User-Content Driven Website," which is hereby incorporated by reference in its entirety. The aggregated content may be provided to users of the website (e.g., may be highlighted on the website), may be provided responsive to a search query or an inbound link, or the like. The selection of the content to be highlighted on the website and/or to be included in a particular aggregation may be based in part upon the user-submitted ratings of the content.

In some embodiments, the website may be configured to provide inducements to reward users who submit high-quality content. These inducements may comprise monetary rewards, credits for use on the website (e.g., storage space for user-submitted content, etc.), and the like. Similarly, the inducements may be related to a user's reputation on the website. For example, a user may be assigned a "user rating," which may be derived from the ratings of content submitted by the user. A high-user rating may indicate that the user has consistently submitted high-quality content to the website. The user rating may be displayed in connection with user's activities on the website (e.g., in connection with content submitted by the user, posts made by the user, in a user profile of the user, and so on). Accordingly, other users of the website may be provided an easy-to-digest indication of the nature of the user's contributions to the site. Other users may weigh the user's contributions and/or opinions provided on the website based on his/her user rating (e.g., the user rating may determine the "gravitas" of the user on the website).

The quality of the user-ratings may, therefore, be of significant importance to the success of the website; accurate user ratings may allow the website to: identify content to highlight on the website (e.g., for prominent display on the website, to display responsive to inbound links, for aggregation into a particular arena, or the like); provide user feedback and inducement to submit quality work; provide a user reputation system (e.g., via a user rating); and the like.

User ratings, however, may not always accurately reflect the quality of content submitted to the website. There are many possible reasons why user-submitted ratings may not be accurate. For example, some users may base their ratings on a relationship (good or bad) with the content-submitter. This may be particularly true in a website that has a cohesive user community, in which users interact with one another on forums, discussions boards, in their day-to-day activities (e.g., in "real life"), professionally, or the like. In addition, members of the user community may not be trained as reviewers and/or may not have experience reviewing the content on the website. Some ratings may be submitted as part of an organized "astroturfing" campaign in an attempt to artificially inflate the rating of particular content items (e.g., as part of a viral advertising campaign, to promote a particular point-of-view, or the like). Moreover, even if some users provide accurate, "expert" reviews, these high-quality reviews may be "drowned out" by other, lower quality reviews submitted to the website. Accordingly, in some cases, user-submitted ratings may not provide an accurate reflection of the quality of content available on the website.

This disclosure provides systems and methods for calibrating user ratings to increase the accuracy of user-submitted ratings. In one embodiment, one or more members of a user community may be identified as expert raters. The expert raters may be selected from an existing website user community or, alternatively, may be recruited into the user community for the purpose of providing expert ratings. In one embodiment, the expert raters may not be existing members of the website or user community, but instead may be used on a contract basis to rate user-submitted content.

The expert raters may be selected a priori based upon various factors, including credentials, education, professional training, professional experience, and the like. The ratings submitted by an expert rater may be considered to be accurate or "correct" ratings of a particular content item.

Ratings submitted by other community users may be compared to the ratings supplied by the expert raters on an ongoing basis. Community users whose ratings tend to correspond with the ratings provided by the experts may be given more weight than those users whose ratings tend to diverge from the expert ratings. The weight given to a rating submitted by a particular user may be adjusted over time as the user becomes more expert and experienced at rating content featured on the website. In some embodiments, new users may be given a low initial rating weight. The rating weight may be increased over time as the user submits accurate ratings.

FIG. 1 is a flow diagram of one embodiment of a method for calibrating a user rating weight. The method 100 may comprise one or more machine executable instructions stored on a computer-readable storage medium. The instructions may be configured to cause a machine, such as a computing device, to perform the method 100. In some embodiments, the instructions may be embodied as one or more distinct software modules on the storage medium. One or more of the instructions and/or steps of method 100 may interact with one or more hardware components, such as computer-readable storage media, communications interfaces, or the like. Accordingly, one or more of the steps of method 100 may be tied to particular machine components.

At step 110, a user may register with the website. The registration at step 110 may comprise providing the website with a limited amount of personal information, establishing a user name (e.g., a user identifier), providing contact information, creating a password, and the like. Alternatively, or in addition, registration may comprise the user presenting a credential (or other information) from a third-party identity service, such as Windows Live ID, OpenID®, or the like. The third-party service may provide the identity of the user and/or allow the method 100 to authenticate the identity of the user at step 110.

At step 120, a user may be identified as an "expert" rater or a standard, new community user (e.g., non-expert rater). As discussed above, a subset of users of a website may be deemed to be expert raters. These users may be selected based on their activities outside of the website (e.g., professional training, education, or the like), and/or may be selected based on their activities on the website or user community (e.g., consistently submitting highly-rated content, etc.) If the new user is identified as an expert rater, the flow may continue to step 125; otherwise, the flow may continue to step 130.

At step 125, the user may be marked as an expert rater, and an initial rating weight for the expert user may be determined. Since the user was identified as an expert rater at step 120, the initial rating weight of the user may be set relatively high (e.g., ten on a scale of one to ten). Alternatively, where the intent of the site is to gauge user-community ratings and/or to train community users to be expert raters, the expert weight may be set low (e.g., one, two, or even zero out of ten). In this way, expert ratings may be used principally to calibrate community raters and not as user ratings themselves. Although FIG. 1 shows a user receiving expert-rater status during user registration (e.g., step 110), one skilled in the art would recognize that such expert rater status could be granted and/or revoked at any time after account registration. The expert rater status of the user and/or the initial rating weight may be stored in computer-readable storage medium in connection with the user registration information, such as a user profile or the like.

At step 130, an initial rating weight for a non-expert user may be determined. In one embodiment, the initial rating weight may be an average or mean rating weight of other users (e.g., other users of the website and/or other users in a user community); for example, for rating weights ranging from one to ten, the new user may be given an initial weight of five. Alternatively, the user may begin with relatively low or even zero, rating weight (e.g., one or two out of ten). A low initial rating rate may prevent new user accounts from being used to improperly influence content ratings (e.g., as part of an astroturfing scheme). As will be discussed below, as the user submits ratings, the rating weight of the user may be calibrated according to the quality of the user ratings.

At step 140, a user rating of a content item on the website may be received. At step 145, the user account originating the rating may be checked to determine whether the submitter is an expert or non-expert user. If the user is an expert rater, the flow may continue to step 150; otherwise, the flow may continue to step 170.

At step 150, the expert rating may be stored in a ratings database. The ratings database may comprise any computer-readable storage medium and/or data retrieval system known in the art, including, but not limited to: a database, such as a structured query language (SQL) compliant data base, an extensible markup language (XML) data base, or the like; a directory, such as an X.509 directory, a light weight directory access protocol (LDAP) compliant directory; or any other data storage and/or retrieval system known in the art. The rating may be marked as an "expert" rating and may be used to calibrate other user ratings.

At step 160, the newly-submitted expert rating may be used to calibrate users who had previously submitted ratings for the content item. At step 163, the ratings database may be searched for all user-submitted ratings of the content item. At step 165, method 100 may iterate over each user-submitted rating found in the ratings database.

At step 167, each of the user-submitted ratings may be compared to the expert rating, and a rating weight of the submitter may be calibrated. If more than one expert rating has been submitted, the user rating may be calibrated using an aggregate expert rating derived from the plurality of expert ratings. The aggregate expert rating may be an average or mean of the expert ratings. Alternatively, or in addition, the expert raters may be assigned respective expert rating weights (discussed below), which may be used to determine the aggregate expert rating.

The calibration of step 167 may comprise determining a difference between the user-submitted rating and the expert rating. If the user rating corresponds to the expert rating (e.g., is equal to, or within a threshold of the expert rating), the user's rating weight may be increased. Alternatively, if the user-submitted rating significantly diverges from the expert rating (e.g., differs by one or more standard deviation or by some other threshold), the user's rating weight may be decreased. If the rating does not within either threshold, the user rating weight may be unchanged. There are various methodologies and techniques that could be used to calibrate raters. For example, a statistical model may be used including, but not limited to: statistical modeling using a normal distribution of rating weights, a Bayesian model, a Normal distribution, or the like. Alternatively, the weighting may be done using a simple scoring system where weight "points" are added if the user and expert ratings are within a threshold (e.g., within a two-point threshold), and are subtracted if the user and expert diverge more than a threshold (e.g., more than a four-point threshold). One skilled in the art would recognize that any number of different modeling, comparison, and weighing techniques and/or methodologies could be used under the teachings of this disclosure. As such, this disclosure should not be read as limited to any particular modeling, comparison, and/or weighting technique and/or methodology.

The modified rating weight may be stored in a user profile or other data structure. The modified rating weight(s) may be used the next time the users submit a rating of a content item on the website and/or may be used to calculate an aggregate rating of the content item as discussed below.

At step 169, the flow may determine whether there are additional user-submitted ratings to process. If so, the flow may continue at step 165 where the next user-submitted may be processed; otherwise, the flow may terminate.

At step 170, the ratings database may be queried to find any expert-submitted ratings for the content item. At step 173, if no expert ratings have been received, the flow may terminate; otherwise, the flow may continue to step 175.

At step 175, the user may be calibrated according to the one or more expert user ratings found at step 170. The user-rating calibration may be performed as described above in conjunction with step 167.

At step 180, the user rating may be weighted according to the rating weight of the user as calibrated at step 175. Step 180 may comprise storing the modified rating weight in a user profile or other data store.

A method similar to method 100 may be used to calibrate the expert raters themselves. For example, multiple experts may rate a particular content item. The plural expert ratings may be used to determine an aggregate expert rating, which may be used to calibrate user ratings. The aggregate expert rating may be an average or mean of the expert ratings. Alternatively, the expert ratings may be assigned relative weights, which may be assigned according to, inter alia, the consistency of the expert ratings. For example, the expert ratings themselves may be compared to determine whether the expert ratings are consistent. An expert calibration method may detect that one or more experts consistently provide ratings that differ from ratings provided by a majority of the other community experts and/or users in the community. The difference may be a statistical difference, such as a variance or other measure. As such, the threshold difference may be relative to the cohesiveness of the other expert raters. For example, an expert may be considered to be an "outlier" from the other expert raters if a rating submitted by the expert differs from the mean by a threshold based upon a deviation (e.g., standard deviation) or the other expert ratings. If the expert is an "outlier" in enough cases, the "expert" status of the user may be revoked and/or modified.

As discussed above, in some embodiments, the expert raters may be given an expert rating weight, which may reflect the consistency of the ratings submitted by the expert with respect to other expert raters. An expert that provides highly variable ratings as compared to other experts may be given a lower expert rating weight, whereas an expert rater that provides consistent expert ratings may be given a greater expert rating weights. The expert rating weights may be used to establish an aggregate expert rating where two or more experts have submitted an expert rating of a particular content item.

The rating weight assigned to a particular user may be displayed in connection with content submitted by the user (e.g., may be displayed in the user profile of the user). Accordingly, the user may be provided with feedback regarding the accuracy of his or her ratings relative to the expert raters. Since the rating weight may be displayed in connection with content submitted by the user and/or the user profile, which may be easily accessible by other users in the community, users may be motivated to submit thoughtful and accurate ratings in order to increase their rating weight. As such, a user's rating weight may act to "qualify" and/or lend weight to the user's opinion and interactions on the website. For example, community users may give more weight to the opinion of a user having a high rating weight than that of a lower-weighted user. In this way, the user rating weight may act as an inducement to encourage community users to thoughtfully rate content on the website. In an alternative embodiment, the rating weight of users may be hidden.

As discussed above, the website may allow users to rate various different rating categories and/or aspects of a content item. For example, an image may include a "subject appeal" rating category, a "technical merit" rating category, a "processing" category, and so on. A particular user may be considered to be an expert when rating a particular category (e.g., "technical merit"), but not when rating another category (e.g., "processing"). Accordingly, when submitting a user rating, some ratings may be expert ratings, and other ratings may be "non-expert" ratings.

In some embodiments, a user may be assigned a different rating weight for each of a plurality of different rating categories or aspects. As such, a rating weighting process, such as the method 100 discussed above, may be performed for each rating category or aspect (e.g., the method 100 may compare multiple rating categories to different respective expert ratings). The user calibration process (e.g., method 100) may, therefore, calibrate each rating weight separately. For instance, a user may provide highly accurate ratings in the "technical merit" rating category (as determined by comparing the user's ratings against expert ratings as discussed above). As such, the "technical merit" rating of the user may be large, and "technical merit" ratings submitted by the user may be given significant weight. The user, however, may provide poor ratings in the "processing" category and, as such, be assigned a lower weight for rating submitted in the "process" category.

As discussed above, user-submitted ratings of a particular content may be used to create an aggregate rating. Calculating the aggregate rating may include weighting ratings submitted by the users according to each of the users' respective rating weights. Weighting the user-submitted ratings may comprise giving more statistical weight to user having high rating weights than to ratings submitted by users having a lower rating weight. The weighting may be linear (e.g., a user with a weight of two may be given twice as much weight as a user having a weight of one, and so on). Alternatively, an exponential, logarithmic, or other scaling type may be used to weigh the ratings. One skilled in the art would recognize that any weighting and/or overall rating calculation technique and/or methodology could be used under the teachings of this disclosure. As such, this disclosure should not be read as limited to any particular rating weighting and/or overall rating calculation technique and/or methodology.

Figure 2:
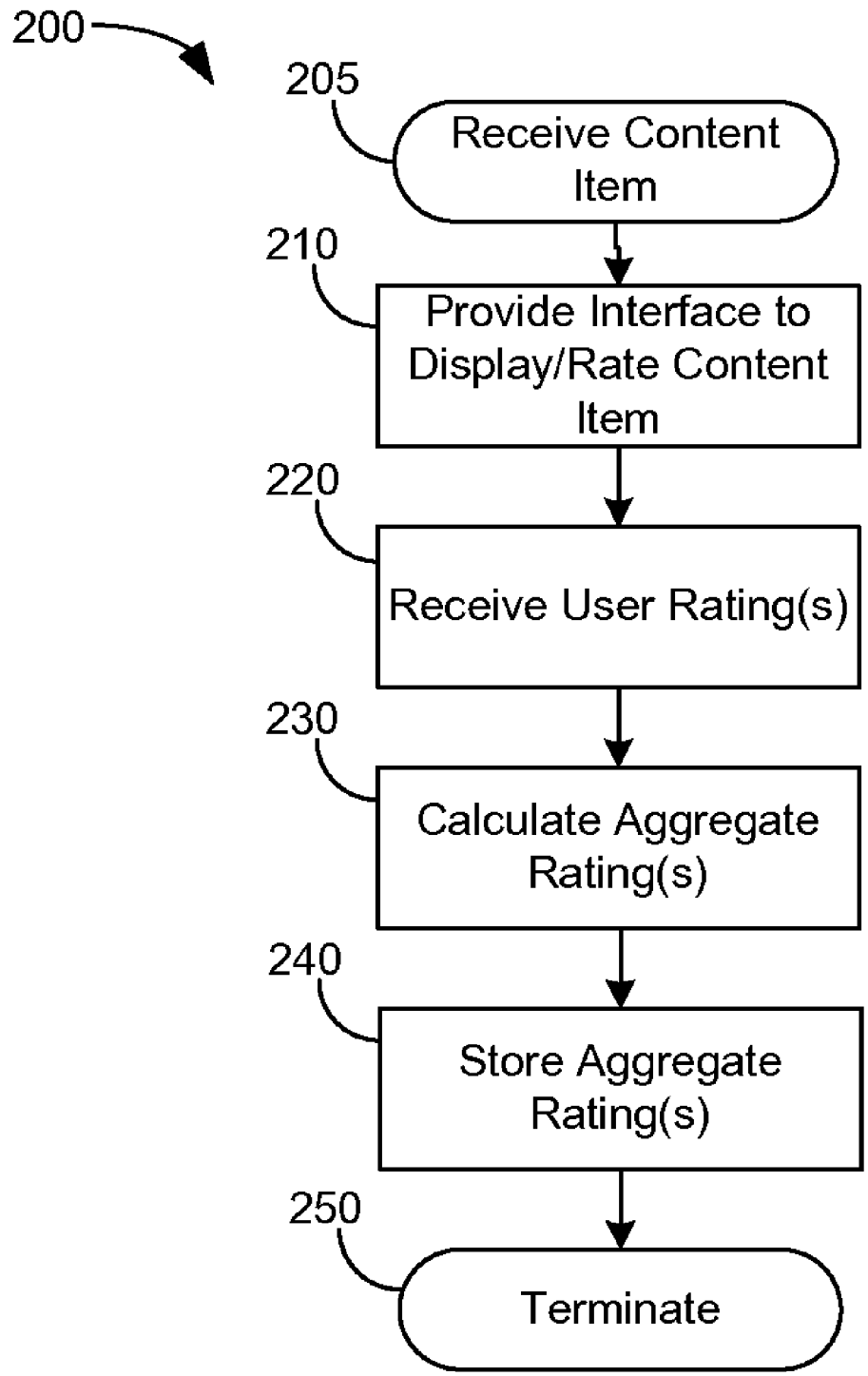
FIG. 2 is a flow diagram of one embodiment of a method for calculating an aggregate rating using weighted user ratings.

FIG. 2 is a flow diagram of one embodiment of a method for determining an aggregate rating of a content item. The method 200 may comprise one or more machine executable instructions stored on a computer-readable storage medium. The instructions may be configured to cause a machine, such as a computing device, to perform the method 200. In some embodiments, the instructions may be embodied as one or more distinct software modules on the storage medium. One or more of the instructions and/or steps of method 200 may interact with one or more hardware components, such as computer-readable storage media, communications interfaces, or the like. Accordingly, one or more of the steps of method 200 may be tied to particular machine components.

At step 205, a user may submit a content item to the website via an interface provided thereby. Responsive to the submission, the website may store the content item in a computer-readable storage medium and make the content item available to one or more users of the website.

At step 210, the method may provide an interface to display the content item. The interface may include one or more rating inputs to accept user-submitted ratings of the content item displayed therein. The rating inputs may include an overall rating of the content item and/or rating inputs for one or more rating categories or aspects.

At step 220, a plurality of user-submitted ratings may be received. Each rating may be received from a user assigned one or more rating weights. The rating weights may be stored in a user profile of the user or in some other data storage location.

At step 230, the plurality of ratings may be used to determine an aggregate rating of the content item. Step 230 may be performed as each rating is received (e.g., each time step 220 is performed), may be performed at a particular intervals (e.g., for each 50 ratings received), and/or may be performed after ratings have been "closed" for a particular content item (e.g., the content item may be available to be rated for a limited time period and/or until a particular number of ratings have been received, after which no more ratings may be submitted). In some embodiments, the aggregate rating(s) of a content item may not be displayed until the rating period of the content item has been completed. Alternatively, or in addition, the aggregate rating of a content item may not be displayed until the user has submitted a rating of the content item, which may prevent the user from being influenced by other users' ratings.

The aggregate rating of a content item may be determined using the plurality of user-submitted ratings thereof. In some embodiments, the aggregate rating may be a (linear) weighted average of the user-submitted ratings (e.g., each user rating may be weighted according the user's rating weight), as shown in Equation 1 below:

$$R_A = \frac{1}{N \cdot \sum_{i=1}^{N} W_i} \cdot \sum_{i=1}^{N} W_i \cdot R_i. \qquad \text{Eq. 1}$$

In Equation 1, $R_A$ is the aggregate rating of the content item (or aggregate rating of a particular rating category or aspect of the content item), N may be the number of users who have submitted ratings, $W_i$ may be the rating weight of a particular user, and $R_i$ may be rating given by the particular user.

At step 240, the aggregate rating may be stored in a computer-readable storage medium. In addition, at step 240, the aggregate rating may be made available for display in conjunction with the content item, made available for use in determining a user rating of the submitter, and the like. At step 250, the method may terminate.

Figure 3:
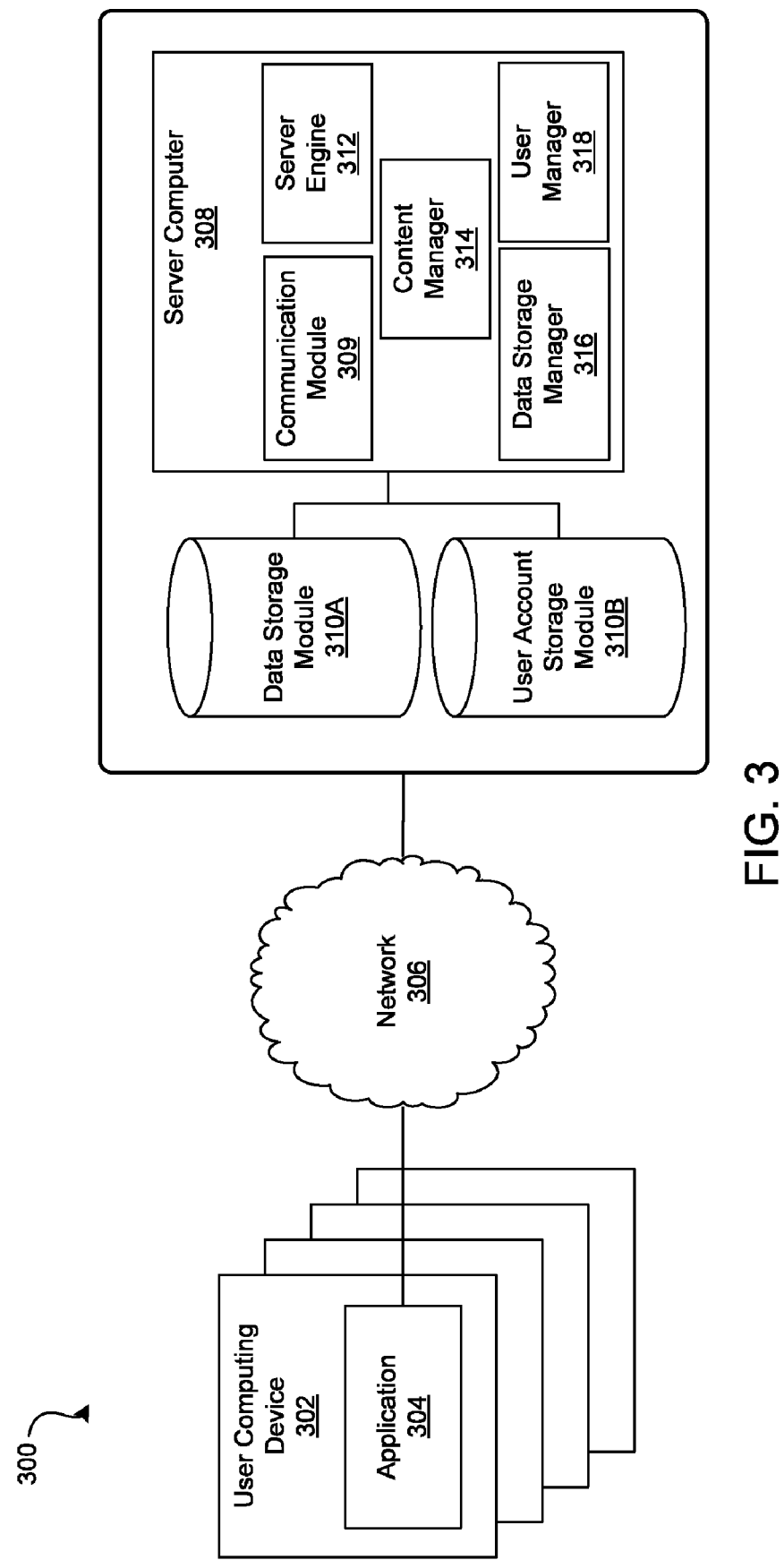
FIG. 3 is a block diagram of a system for calibrating a user-rating weight.

FIG. 3 is a block diagram of a system 300 for maintaining and/or calibrating user rating weights. The system 300 may be implemented within a distributed network environment comprising one or more user computing devices 302 communicatively coupled to a server computer 308 via a network 306. In FIG. 3, one or more of the user computing devices 302 may comprise an application 304 that may be used to access and/or exchange data with other computing devices on the network, such as the server computer 308. The server computer 308 may include and/or be communicatively coupled to a processor (not shown), memory (not shown), input/output devices (not shown), computer-readable storage media (e.g., data storage modules 210A and 210B), and the like.

The application 304 may comprise a web browser, such as Microsoft Internet Explorer®, Mozilla Firefox®, Opera®, or the like. Alternatively, the application 304 may be a media player and/or content presentation application, such as Adobe Creative Suite®, Microsoft Windows Media Player®, Winamp®, or the like.

The application 304 may comprise a network interface component (not shown) to allow the application 304 to access content from the server 308 via the network 306. For example, Adobe Creative Suite® may provide access to a stock photo repository to allow users to purchase content for integration into an Adobe® project; a media player, such as Microsoft Windows Media Player®, may provide access to online, streaming music to allow a user to purchase audio content therefrom, and a web browser may provide access to web accessible content on the network 306.

The application 304 may allow a user to access websites or other content accessible via a Transmission Control Protocol (TCP) Internet Protocol (IP) network (e.g., a TCP/IP network). One such network is the World Wide Web or Internet. One skilled in the art, however, would recognize that the teachings of this disclosure could be practiced using any networking protocol and/or infrastructure. As such, this disclosure should not be read as limited to a TCP/IP network, the Internet, or any other particular networking protocol and/or infrastructure.

The user computing devices 302 may comprise other program modules, such as an operating system, one or more application programs (e.g., word processing or spread sheet applications), and the like. The user computing devices 302 may be general-purpose and/or specific-purpose devices that may be programmed to run various types of applications, or they may be single-purpose devices optimized or limited to a particular function or class of functions. Alternatively, the user computing devices 302 may comprise a portable computing device, such as a cellular telephone, personal digital assistant (PDA), smart phone, portable media player (e.g., Apple iPod®), multimedia jukebox device, or the like. As such, this disclosure should not be read as limited to any particular user computing device implementation and/or device interface. Accordingly, although several embodiments herein are described in conjunction with a web browser application, the use of a web browser application and a web browser interface are only used as a familiar example. As such, this disclosure should not be read as limited to any particular application implementation and/or interface.

The network 306 may comprise routing, addressing, and storage services to allow computing devices, such as the user computing devices 302 and the server computer 308 to transmit and receive data, such as web pages, text content, audio content, video content, graphic content, and/or multimedia content therebetween. The network 306 may comprise a private network and/or a virtual private network (VPN). The network 306 may comprise a client-server architecture, in which a computer, such as the server computer 308, is dedicated to serving other client user computing devices 302, or it may have other architectures, such as a peer-to-peer, in which one or more of the user computing devices 302 serve simultaneously as servers and clients. In addition, although FIG. 3 depicts a single server computer 308, one skilled in the art would recognize that multiple server computers 308 could be deployed under the teachings of this disclosure (e.g., in a clustering and/or load sharing configuration). As such, this disclosure should not be read as limited to a single server computer 308.

The server computer 308 may be communicatively coupled to the network 306 by a communication module 309. The communication module 309 may comprise a wired and/or wireless network 306 interface capable of communicating using a networking and/or communication protocol supported by the network 306 and/or the user computing devices 302.

The server computer 308 may comprise and/or be communicatively coupled to a data storage module 310A. The data storage module 310A may comprise one or more databases, XML data stores, file systems, X.509 directories, LDAP directories, and/or any other data storage and/or retrieval systems known in the art. The data storage module 310A may comprise webpages and associated content to be transmitted to one or more of the user computing devices 302 via the network 306. As described above, the data storage module 310A may comprise one or more content items. Each of the content items stored on data storage module 310A may be associated with one or user-submitted ratings, which may be used to derive an aggregate rating of the content items (e.g., using weighted user ratings).

The server computer 308 may comprise a server engine 312, a content manager 314, a data storage manager 316, and a user manager 318. The server engine 312 may perform processing and operating system level tasks including, but not limited to: managing memory access and/or persistent storage systems of the server computer 308, managing connections to the user computing devices 302 over the network 306, and the like. The server engine 312 may manage connections to/from the user computing devices 302 using the communication module 309.

The content manager 314 may create, display, and/or otherwise provide content items to user computing devices 302. The content manager 314 may manage and/or display content items and associated rating information received from one or more community users via the user computing devices 302. The data storage manager 316 may be configured to interface with the data storage module 310A to store, retrieve, and otherwise manage data in data storage module 310A.

In one embodiment, the server engine 312 may be configured to provide data to the user computing devices 302 according to the HTTP and/or secure HTTP (HTTPS) protocols. As such, the server computer 308 may provide webpage content to the user computing devices 302. Although the server computer 308 is described as providing data according to the HTTP and/or HTTPS standards, one skilled in the art would recognize that any data transfer protocol and/or standard could be used under the teachings of this disclosure. As such, this disclosure should not be read as limited to any particular data transfer and/or data presentation standard and/or protocol.

The user computing devices 302 may access content stored on the data storage module 310A and made available by the content manager 314 via a URI. The URI may comprise a domain name indicator (e.g., www.example.com), which may be resolved by a domain name server (DNS) (not shown) in network 306 into an Internet Protocol (IP) address. This IP address may allow the user computing devices 302 to address and/or route content requests through the network 306 to the server computer 308. The URI may further comprise a resource identifier to identify a particular content item on the server computer 308 (e.g., content.html).

Responsive to receiving a URI request, the server engine 312 may be configured to provide the requested content item to the respective user computing device 302. The content manager 314 and data storage manager 316 may be configured to obtain and/or format the requested content item to be transmitted to the respective user computing device 302 by the server engine 312.

Similarly, the server engine 312 may be configured to receive content submitted by a user via one of the one or more user computing devices 302. The user-submitted content may comprise a content item, such as an image, a video clip, audio content, or the like. The user-submitted content may be made available to other users in a website user community.

In addition, the server engine 312 may be configured to receive ratings of one or more content items. Upon receipt a user-submitted rating, the server engine 312 may determine whether any expert ratings have been received for the rated content item. In one embodiment, this may be done by searching the data storage module 310A. If one or more expert ratings have been submitted, the user may be calibrated as described above in conjunction FIG. 1 and method 100. After calibrating the rating weight of the user, the user-submitted rating may be weighted and stored in the data storage module 310A. The user manager 318 may be configured to associate user calibration data (e.g., rating weight values) with respective user accounts in the user account storage module 310B.

The user manager 318 may be configured to interact with the user account storage module 310B. The user account storage module 310B may comprise user account information relating to one or more users authorized to access, submit content to, and/or rate content on the website hosted on server computer 308. The user account information may include an indicator of expert/non-expert rater status, a user rating weight, and/or an expert rating weight. In some embodiments, the user information may be embodied within a user profile. The user profile may comprise a user password, a federated identity (e.g., an OpenID®, a Windows Live ID, or the like), a list of content items accessed by the user, content submitted by the user, ratings of the content submitted by the user, an average of the ratings received by the user, and so on.

The server engine 312 may be configured to display user-submitted content to users accessing the server 308 via the network 306. The server engine 312 may be configured to display user profile information stored in the user account storage module 310B in conjunction with content items and/or posts submitted by a particular user. As discussed above, a user profile may comprise a display of the user's rating weight relative to the other community users. In addition, the user profile may comprise an indicator of whether the user is considered to be an "expert" rater. Alternatively, the user rating weight and/or expert status may be hidden from other users and/or may be hidden from the user.

The content manager 314 may be configured to provide a display interface to display user-submitted content items stored on the data storage module 310A. The interfaces provided by the content manager 314 may include one or more inputs adapted to receive user-submitted ratings. User-submitted ratings may be used (along with the user rating weights) to determine an aggregate rating of the content items. The aggregate rating may be displayed in the interface. In some embodiments, the aggregate rating may be hidden until a user of the interface has submitted a user rating of the content item.

The content manager 314 may assign an expert rating to the content items within the data storage module 310A. Assigning an expert rating may comprise receiving a rating submitted by an expert rater. If more than one expert rating is received for a particular content item, the expert ratings may be combined to form an aggregate expert rating. The resulting expert rating may be an average and/or a weighted average of the expert ratings (e.g., may be weighted by respective expert rating weights).

The user manager 318 may be configured to manage user rating weights for the user accounts. The user manager 318 may compare user submitted ratings to expert ratings. If the user ratings are within a threshold of the expert ratings, the user ratings may be increased. If the user ratings fall outside of a threshold, the user rating weights may be decreased. In some embodiments, if the user rating weights may be modified according to the proximity of the user ratings to the expert ratings. Accordingly, the closer the ratings are to the expert ratings, the more the respective rating weights may be increased. Similarly, the further the ratings are to the expert ratings, the more the rating weights may be decreased, and so on.

The server computer 308, the data storage module 310A, and the user account storage module 310B may comprise security measures to inhibit malicious attacks thereon, and to preserve integrity of the messages and data stored therein. Such measures may include, but are not limited to: firewall systems, secure socket layer (SSL) communication, user authentication, public key infrastructure (PKI) authentication, password protection schemes, data encryption, and the like.

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps or by a combination of hardware, software, and/or firmware.

Embodiments may also be provided as a computer program product including a computer-readable medium having stored thereon instructions that may be used to program a computer (or other electronic device) to perform processes described herein. The computer-readable medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

As used herein, a software module or component may include any type of computer instruction or computer executable code located within a memory device and/or transmitted as electronic signals over a system bus or wired or wireless network. A software module may, for instance, comprise one or more physical or logical blocks of computer instructions, which may be organized as a routine, program, object, component, data structure, etc. that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be understood by those having skill in the art that many changes may be made to the details of the above-described embodiments without departing from the underlying principles of the invention.

I claim:

1. A non-transitory computer-readable storage medium comprising instructions to cause a computing device to perform a method for calibrating a rating weight assigned to a user, comprising:

assigning an expert rating to a content item;
receiving a rating of the content item submitted by the user;
adjusting a rating weight of the user based on a comparison between the rating submitted by the user and the expert rating; and
calculating an aggregate rating of the content item from a plurality of user-submitted ratings, wherein each of the user submitted ratings is submitted by a user having a respective rating weight, and wherein the aggregate rating is based upon the plurality of user submitted ratings and the respective rating weights;
wherein the aggregate rating is calculated using the following equation:

$$R_A = \frac{1}{N \cdot \sum_{i=1}^{N} W_i} \cdot \sum_{i=1}^{N} W_i \cdot R_i.$$

2. The computer-readable storage medium of claim 1, wherein the rating weight of the user is increased if the rating submitted by the user is within a threshold of the expert rating.

3. The computer-readable storage medium of claim 1, wherein the rating weight of the user is decreased if the rating submitted by the user differs from the expert rating by more than a threshold.

4. The computer-readable storage medium of claim 1, wherein calculating the aggregate rating comprises weighting each of the user submitted ratings by a respective user rating weight.

5. The computer-readable storage medium of claim 4, wherein the user submitted ratings are linearly scaled by the respective user rating weights.

6. The computer-readable storage medium of claim 4, wherein the user submitted ratings are exponentially scaled by the respective user rating weights.

7. The computer-readable storage medium of claim 4, wherein the user submitted ratings are logarithmically scaled by the respective user rating weights.

8. The computer-readable storage medium of claim 1, wherein the expert rating assigned to the content item comprises a plurality of ratings in a plurality of different rating categories, wherein the rating submitted by the user comprises a plurality of user-submitted ratings in two or more of plurality of different rating categories, and wherein the adjusting the rating weight of the user comprises adjusting each of a plurality of rating weights for each of the two or more different rating categories rated by the user.

9. The computer-readable storage medium of claim 1, further comprising providing an interface to display content submitted by the user, wherein the interface includes an indication of the rating weight of the user.

10. The computer-readable storage medium of claim 1, further comprising providing an interface to display a user profile of the user, wherein the interface includes an indication of the rating weight of the user.

11. The computer-readable storage medium of claim 1, further comprising providing an interface to display the content item, wherein the interface comprises a content item rating input, and wherein the interface is configured to display an aggregate rating of the content item after a rating of the content item has been submitted through the content rating input.

12. The computer-readable storage medium of claim 1, further comprising providing an interface to display the content item, wherein the interface comprises a content item rating input and an indicator to display an aggregate rating of the content item.

13. The computer-readable storage medium of claim 12, wherein the indicator is configured to display the aggregate rating when a user of the interface has submitted a rating of the content item, and wherein the indicator is configured to display the aggregate rating of the content item and the rating submitted by the user of the interface.

14. The computer-readable storage medium of claim 1, further comprising designating one or more of a plurality of users as expert raters, and wherein assigning an expert rating to the content item comprises receiving a rating of the content item submitted by one or more of the expert raters.

15. The computer-readable storage medium of claim 14, wherein two or more expert raters submit a rating of the content item, and wherein the expert rating of the content item is an average of the two or more ratings submitted by the two or more expert raters.

16. The computer-readable storage medium of claim 15, wherein each of the users designated as expert raters has a respective expert rating weight, and wherein the expert rating of the content item is a weighted average of the two or more ratings submitted by the two or more expert raters.

17. The computer-readable storage medium of claim 1, wherein the expert rating is assigned after the user submits the user rating.

18. A system for calibrating a rating weight assigned to a user, comprising:
   a computing device comprising a processor;
   a content manager operable on the processor and comprising a content item assigned an expert rating; and
   a user manager operable on the processor and communicatively coupled to the content manager, wherein the user manager is configured to adjust a rating weight of a user based on a comparison between the expert rating and a rating of the content item submitted by the user;
   wherein the content manager is configured to calculate an aggregate rating of the content item from a plurality of user-submitted ratings, wherein each of the user submitted ratings is submitted by a user having a respective rating weight, and wherein the aggregate rating is based on the plurality of user submitted ratings and the respective rating weights; and
   wherein the aggregate rating is calculated using the following equation:

$$R_A = \frac{1}{N \cdot \sum_{i=1}^{N} W_i} \cdot \sum_{i=1}^{N} W_i \cdot R_i.$$

19. The system of claim 18, wherein the rating weight of the user is increased if the rating submitted by the user is within a first threshold of the expert rating, is decreased if the rating submitted by the user differs from the expert rating by more than a second threshold, and is unchanged otherwise.

20. The system of claim 18, wherein the rating weight is adjusted proportionally to a proximity of the user submitted rating to the expert rating.

21. The system of claim 18, wherein the content manager is configured to provide an interface to display content submitted by the user, and wherein the interface includes an indication of the rating weight of the user.

22. A computer-implemented method for calibrating a rating weight assigned to a user, the method being performed by a processor executing instructions stored in a memory, the method comprising:
   assigning an expert rating to a content item;
   receiving a rating of the content item submitted by the user;
   adjusting the rating weight of the user based upon a comparison of the expert rating and the rating submitted by the user, wherein the rating weight is incremented if the rating submitted by the user is within a first threshold of the expert rating, the rating weight is decremented if the rating submitted by the user differs from the expert rating by more than a second threshold, and is unchanged otherwise;
   providing an interface to display content submitted by the user, the interface comprising an indication of the rating weight of the user; and
   calculating an aggregate rating of the content item from a plurality of user-submitted ratings, wherein each of the user submitted ratings is submitted by a user having a respective rating weight, and wherein the aggregate rating is based on the plurality of user submitted ratings and the respective rating weights;
   wherein the aggregate rating is calculated using the following equation:

$$R_A = \frac{1}{N \cdot \sum_{i=1}^{N} W_i} \cdot \sum_{i=1}^{N} W_i \cdot R_i.$$

* * * * *